(12) United States Patent
Nichols

(10) Patent No.: US 7,320,362 B2
(45) Date of Patent: Jan. 22, 2008

(54) DYNAMIC FLUID DELIVERY SYSTEM WITH COMPENSATION

(75) Inventor: Steven C. Nichols, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 495 days.

(21) Appl. No.: 10/878,791

(22) Filed: Jun. 28, 2004

(65) Prior Publication Data

US 2005/0284622 A1    Dec. 29, 2005

(51) Int. Cl.
*F24F 3/00*   (2006.01)
(52) U.S. Cl. .......................... 165/205; 62/186
(58) Field of Classification Search ............. 165/205, 165/208; 62/186
See application file for complete search history.

(56) References Cited

U.S. PATENT DOCUMENTS

| | | | |
|---|---|---|---|
| 4,530,395 | A | 7/1985 | Parker et al. |
| 4,890,666 | A | 1/1990 | Clark |
| 4,931,948 | A | 6/1990 | Parker et al. |
| 5,318,104 | A | 6/1994 | Shah et al. |
| 5,544,697 | A | 8/1996 | Clark |
| 5,769,315 | A | 6/1998 | Drees |
| 5,810,245 | A | 9/1998 | Heitman et al. |
| 5,829,674 | A | 11/1998 | Vanostrand et al. |
| 5,944,098 | A | 8/1999 | Jackson |
| 2004/0194484 | A1 * | 10/2004 | Zou et al. ............ 62/186 |

\* cited by examiner

*Primary Examiner*—Ljiljana Ciric

(57) ABSTRACT

Flow is managed within a fluid delivery system. One illustrative fluid delivery system is a zoned HVAC system. In one illustrative embodiment, a method is provided for controlling the airflow and thus the heat or cool delivery rate to a room serviced by the zoned HVAC system. The zoned HVAC system includes a duct system that is in fluid communication with various rooms through zone dampers. An open/closed state of the zone dampers is determined, and an open time for at least selected zone dampers are adjusted based on the state of the dampers.

12 Claims, 16 Drawing Sheets

DYNAMIC FLUID DELIVERY SYSTEM WITH COMPENSATION

TECHNICAL FIELD

The present invention generally relates to fluid delivery systems, and more particularly, to fluid delivery systems adapted for thermal energy compensation.

BACKGROUND

Fluid delivery systems are commonly used today in a wide variety of applications. Air delivery systems such as forced air systems are commonly used to deliver conditioned air to one or more locations within a house or building. Water delivery systems such as sprinkler systems are commonly used for delivering water to sprinkler heads in, for example, a buried sprinkler system or in a fire prevention sprinkler system. Water circulation systems are commonly used to heat and/or cool both residential and commercial buildings. These are just a few examples of fluid delivery systems.

Fluid delivery systems often include a network of pipes or ducts. In many cases, one or more valves or dampers, such as zone valves or dampers, are used to control the fluid flow through all or part of the pipes or ducts of the distribution network. In some cases, the network of pipes or ducts is broken up into zones, where some or all of the zones can be independently activated by one or more corresponding zone valves or dampers.

In a fluid delivery system such as described herein, the amount of fluid available to a particular zone can vary depending on how many other zone valves or dampers are open or closed. In a water delivery system such as an underground sprinkler system, the amount of water pressure available to a specific sprinkler head will depend on a gross water pressure available to the system itself as well as the number of open sprinkler heads at any given time. In a forced air delivery system such as a forced air heating or cooling system, the amount of conditioned air available to a specific zone will often depend on the gross thermal capacity of the heating or cooling system, as well as the number of open zones at any given time.

In many forced air heating and cooling systems, each zone will have a damper that controls air flow to the particular zone. The zone damper can open to permit conditioned air to flow into the zone from a source of conditioned air. The amount of heating or cooling delivered to the zone is often a function of the thermal capacity of the conditioned air and the relative amount of time that the zone damper is open.

As noted, the actual amount of conditioned air (and thus the amount of heating or cooling delivered) can vary depending on, for example, the number of open zones or dampers relative to the total number of zones or dampers in the system. For example, as zone dampers close over time, more heating and/or cooling may be delivered through the remaining open dampers, sometimes resulting in significant variations in the amount of heating and/or cooling that is delivered to each remaining open zone. This variation in the amount of heating and/or cooling that is delivered to a zone can significantly degrade a controllers ability to maintain adequate temperature control within a zoned system. Thus, a need remains for methods and system for controlling forced air and/or other systems that can account for the status of other zones within a multi-zone system.

SUMMARY

The present invention generally relates to fluid delivery systems, and in some cases, zoned fluid delivery systems such as zoned HVAC systems.

In one illustrative embodiment, a method is provided for controlling an HVAC system that has a number of zones that each has one or more zone dampers. An open/closed state for at least some of the zone dampers can be determined, and an open time for at least selected zone dampers can be adjusted based on the state of at least some of the zone dampers. In some instances, the open time can be adjusted based on how many of the zone dampers are in an open state relative to how many of the zone dampers are in a closed state.

In some embodiments, the zone damper includes an initial open time that can be reduced by an amount that is dependent on the status of one or more other zone dampers. In some cases, the initial open time period can depend upon a thermal demand of a particular zone that is associated with the zone damper.

In another illustrative embodiment, a method is provided for regulating an HVAC system that includes a duct system having a damper. The damper can be opened and the damper can be left open for an open period of time that can be dependent upon a heat delivery rate through the damper. In some cases, the HVAC system can include a multiple speed blower and the heat delivery rate through the damper can be dependent upon the speed at which the blower is operating. In other cases, the HVAC system can include at least one additional damper, and the heat delivery rate through the damper can depend upon whether the additional damper is open or closed.

In yet another illustrative embodiment, a method is provided for managing an HVAC system that has two or more zones each including at least one zone damper. A measure of thermal demand and a measure of available thermal energy can be determined for a zone. A damper can be operated in accordance with the measure of thermal demand and the measure of available thermal energy. In some instances, the measure of the available thermal energy of the zone is dependant at least in part on the number of open zone dampers within the HVAC system and the total number of zone dampers within the HVAC system.

In particular embodiments, the method can include an additional step of periodically recalculating the measure of thermal demand in the zone. In some embodiments, the method can include an additional step of periodically recalculating the measure of available thermal energy for the zone.

In yet another illustrative embodiment, a method is provided for dynamically controlling an HVAC system that has two or more zones, with each zone having one or more zone dampers. A zone can be selected from the two or more zones. A measure of thermal demand and a measure of available thermal energy can be determined for the selected zone. An operational profile based on the measure of thermal demand and the measure of available thermal energy can be calculated. In some instances, the operational profile can provide open and close times for the zone dampers within the selected zone. The method can include a subsequent step of operating the selected zone in accordance with the operational profile.

In some instances, the step of calculating the operational profile can include adjusting the open and close times to account for the amount of thermal energy available to the selected zone. In some cases, the thermal demand for the selected zone can be periodically recalculated and consequently the operational profile can be accordingly adjusted as necessary.

In yet another illustrative embodiment, a method of controlling thermal energy delivery in a system having a number of zones is provided. A zone can be selected based on its thermal demand, and a zone open time can be calculated based on the thermal demand of the zone. A status of each of the zones can be determined and a compensation value can be calculated based on the status of each of the zones. The zone open time can be adjusted as a function of the compensation value. In some instances, the zone selected is the zone having the greatest thermal demand.

In some cases, the compensation value can be calculated based at least in part on a total number of zones relative to a total number of open zones. The compensation value can be used to adjust the zone open time. In some instances, the zone open time is adjusted by dividing the zone open time by the compensation value.

In yet another illustrative embodiment, a method for controlling the opening and closing of a damper in an HVAC system is provided. The damper can be coupled to a duct that delivers air to the damper and that is fluidly connected to one or more other dampers or valves that can assume open and closed positions. The damper can be opened for a length of time and can subsequently be closed after the length of time. In some instances, the length of time can be dependent on the position of at least one of the other dampers or valves that are fluidly connected to the duct.

In yet another illustrative embodiment, a method of controlling an HVAC system is provided. The HVAC system can include a duct system that has a pressure when the HVAC system is operating. The HVAC system can be activated to supply conditioned air into the duct system and can continue to operate in a continuous manner for an operating time period. In some instances, the operating time period can be dependent, at least in part, on the pressure in the duct system.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
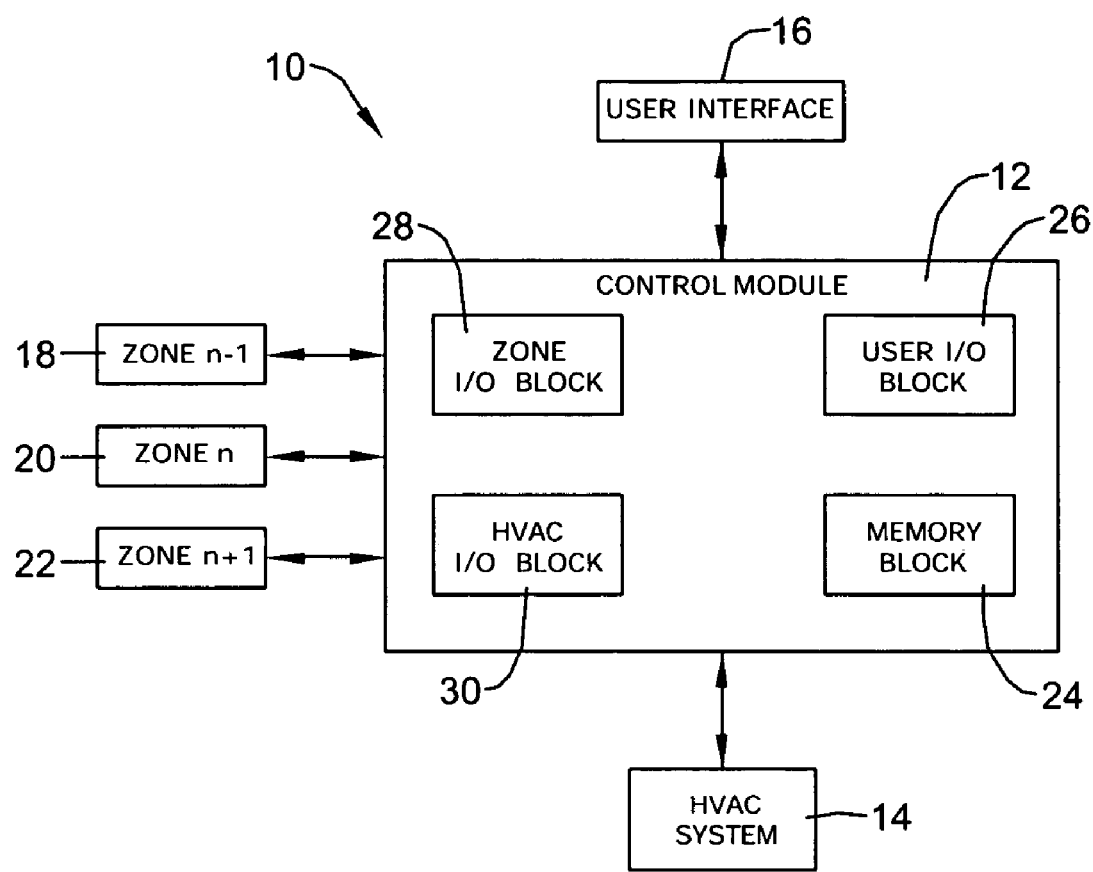
FIG. 1 is a block diagram of a controller in accordance with an illustrative embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention. For example, while HVAC systems are primarily featured as illustrative embodiments herein, it is contemplated that the present invention may be applied to any type of fluid delivery system, as desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The present invention generally pertains to pressurized fluid distribution systems that provide fluid through a pipe or duct network to one or more distinct distribution points. In one illustrative embodiment, the present invention may include an HVAC system that provides conditioned air through ductwork to two or more distinct zones. Each zone can include a damper or similar structure that can move between a closed position in which the damper permits little or no air to pass into the zone and an open position in which the damper provides little or no resistance to conditioned air passing into the zone.

In some cases, the HVAC system provides a relatively constant volume of conditioned air, typically dictated by the HVAC fan size and fan speed. In some instances, however, the HVAC system can include a multiple speed fan. Consequently, the fan can operate at several different speeds in accordance with desired conditioned air volume. In many instances, while the fan speed itself can vary, the thermal output of the HVAC system is essentially constant. In many cases, both furnaces and air conditioning systems are configured to run at a single thermal output. For example, a typical forced air furnace may provide a constant 90,000 BTUs of heat while a typical air conditioning system may provide 2.5 tons of cooling (one ton of cooling equates to 12,000 BTU of removed heat).

In some instances, however, the thermal output of the HVAC system can vary. In some cases, several individual burners or furnaces can be combined in a single system. In circumstances requiring relatively lower amounts of heat, perhaps only one burner or furnace will operate. However, if relatively larger amounts of heat are required, a second or even perhaps a third burner or furnace will operate. In other instances, a furnace such as a forced air furnace can be configured to adjust the fuel flow to its burner or burners and can in this way adjust its thermal output.

Referring now to FIG. 1, which shows a controller 10 in accordance with an illustrative embodiment of the present invention. Controller 10 includes a control module 12 that is configured to monitor and control a system such as an HVAC system 14. Controller 10 also includes a user interface 16 that is configured to provide communication between control module 12 and a user. User interface 16 can be used to communicate status of HVAC system 14 to the user, and/or accept input from the user.

User interface 16 can take a wide variety of different forms. User interface 16 can include one or more of an alpha-numeric display, a graphical display, and/or a key pad having one or more keys or buttons. In some embodiments, user interface 16 can include a touch screen. In other embodiments, user interface 16 can include a display screen and one or more buttons. In some embodiments, a thermostat can function as user interface 16. In systems having more than one zone, a separate thermostat can be positioned within each zone and can together function as user interface 16.

Control module 12 also communicates with zone 18, zone 20 and zone 22. As illustrated, control module 12 communicates with at least three zones 18, 20 and 22, although the invention contemplates systems having, in some cases, one, two, as well more than three zones. Zone 18, 20 and 22 are labeled as "zone n−1", "zone n" and "zone n+1", respectively, with "n" being an integer number. For example, in a hypothetical system having 10 zones, "n" can be an integer that ranges from 2 to 9. To illustrate, if "n" is set equal to 5, zone 18 represents "zone 4", zone 20 represents "zone 5", and zone 22 represents "zone 6".

As will be discussed in greater detail hereinafter, each of zone 18, zone 20 and zone 22 can include one or more dampers that can be reversibly moved between an open position and a closed position. In some cases, control module 12 can provide or receive signals from each of zone 18, zone 20 and zone 22 indicating the relative position of each damper or dampers within each of zone 18, zone 20 and zone 22. In particular, and in one illustrative embodiment, each zone 18, 20 and 22 can include a single damper controlling fluid flow into each zone 18, 20 and 22.

Figure 2:
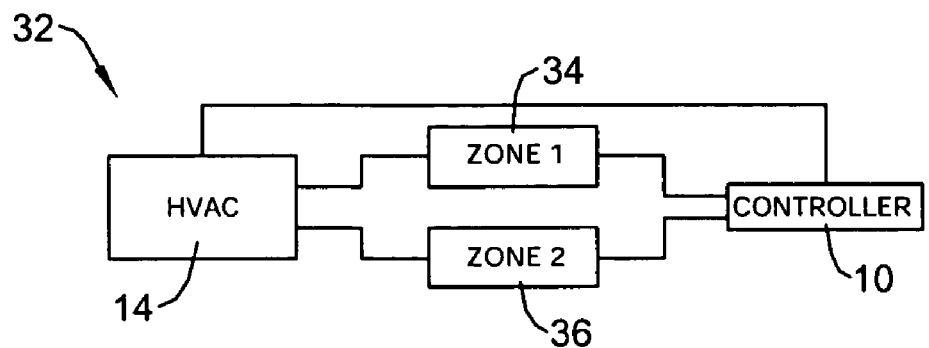
FIG. 2 is a schematic illustration of an HVAC system in accordance with an illustrative embodiment of the present invention.
Figure 3:
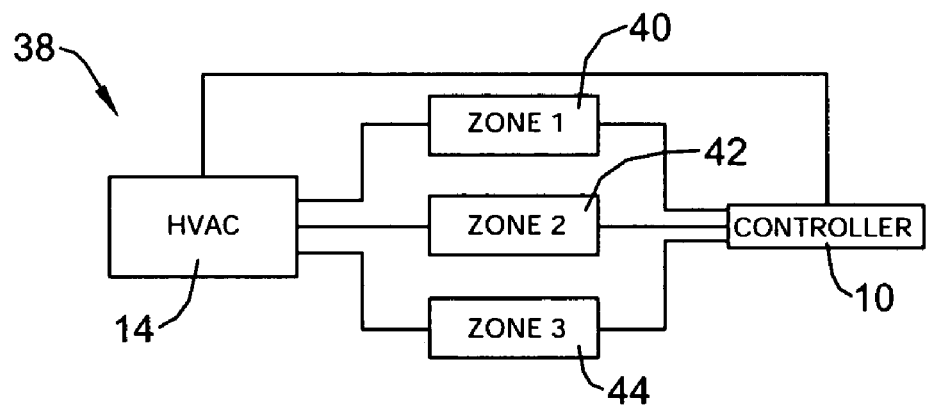
FIG. 3 is a schematic illustration of an HVAC system in accordance with an illustrative embodiment of the present invention.
Figure 4:
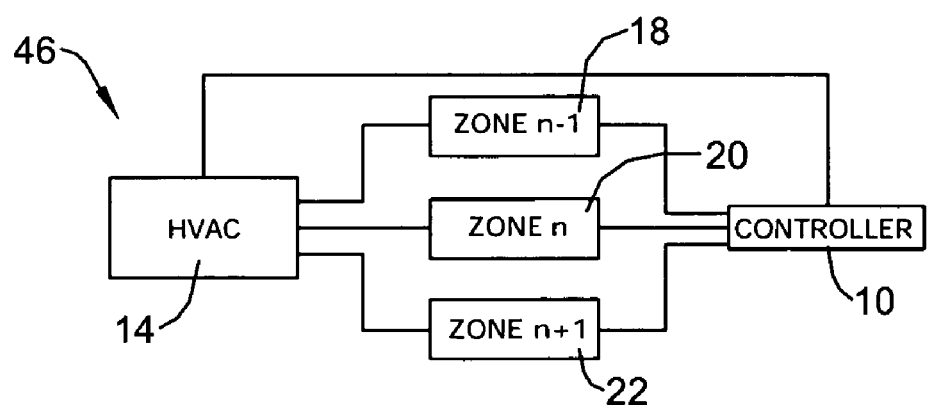
FIG. 4 is a schematic illustration of an HVAC system in accordance with an illustrative embodiment of the present invention.

With reference to FIGS. 2-4, and in the illustrative embodiment, an HVAC system can include any number of distinct zones that provide individualized control over the flow of conditioned air into each distinct zone. FIG. 2 in particular illustrates a system 32 including controller 10 and HVAC system 14. System 32 includes a first zone 34 and a second zone 36. Controller 10 is in communication with first zone 34 and second zone 34, as well as with HVAC system 14. FIG. 3 illustrates a system 38 in which controller 10 is in communication with a first zone 40, a second zone 42 and a third zone 44, as well as HVAC system 14. FIG. 4 illustrates a system 46 in which the three zones shown are generically referenced as zone 18, zone 20 and zone 22 as described above.

With reference to FIG. 1, control module 12 may include a memory block 24 that can store one or more parameter values. Memory block 24 can also store a program that controls the operation of the controller 10, and thus the operations of the HVAC system 14. The program stored within memory block 24 can include instructions for operating HVAC system 14, including turning HVAC system 14 on or off based on a timed schedule. For example, the program can include time and temperature set points.

As noted above, control module 12 communicates with a user through user interface 16. Thus, control module 12 may include a USER I/O block 26 that can include circuitry or software that sends information to user interface 16 and that receives and if necessary translates or modifies signals from user interface 16.

HVAC system 14 can include any desired HVAC equipment. In some embodiments, HVAC system 14 can include a heating plant such as a furnace or a heat pump. HVAC system 14 can also include an air conditioner or a combination of heating and cooling equipment.

In the illustrative embodiment control module 12 also includes a ZONE I/O block 28 that can include software or circuitry that sends signals to one or more of zone 18, zone 20 and zone 22. Such signals can include instructing a damper within one of zone 18, zone 20 and zone 22 to move from an open position to a closed position, or perhaps from a closed position to an open position, or in some cases, an intermediate position. ZONE I/O block 28 may also receive signals from one or more of zone 18, zone 20 and zone 22. Such signals can inform control module 12 of the relative position of one or more dampers within one or more of zone 18, zone 20 and zone 22. Such signals can also include temperature signals from temperature sensors within one or more of zone 18, zone 20 and zone 22.

Control module 12 may also include an HVAC I/O block 30 that can include software or circuitry that sends and receives signals between control module 12 and HVAC system 14. Control module 12 can send instructional signals such as on/off commands and equipment selection commands to HVAC system 14. If HVAC system 14 includes a variable speed fan and/or is configured to provide varying thermal outputs, HVAC I/O block 30 can provide HVAC system 14 with the appropriate instructions to vary the fan speed and/or the burner output. HVAC system 14 can in turn send informational signals such as confirming commands to control module 12. Illustrative interactions between MEMORY block 24, USER I/O block 26, ZONE I/O block 28 and HVAC I/O block 30 are further illustrated below with respect to, for example, FIGS. 5 through 18.

Figure 5:
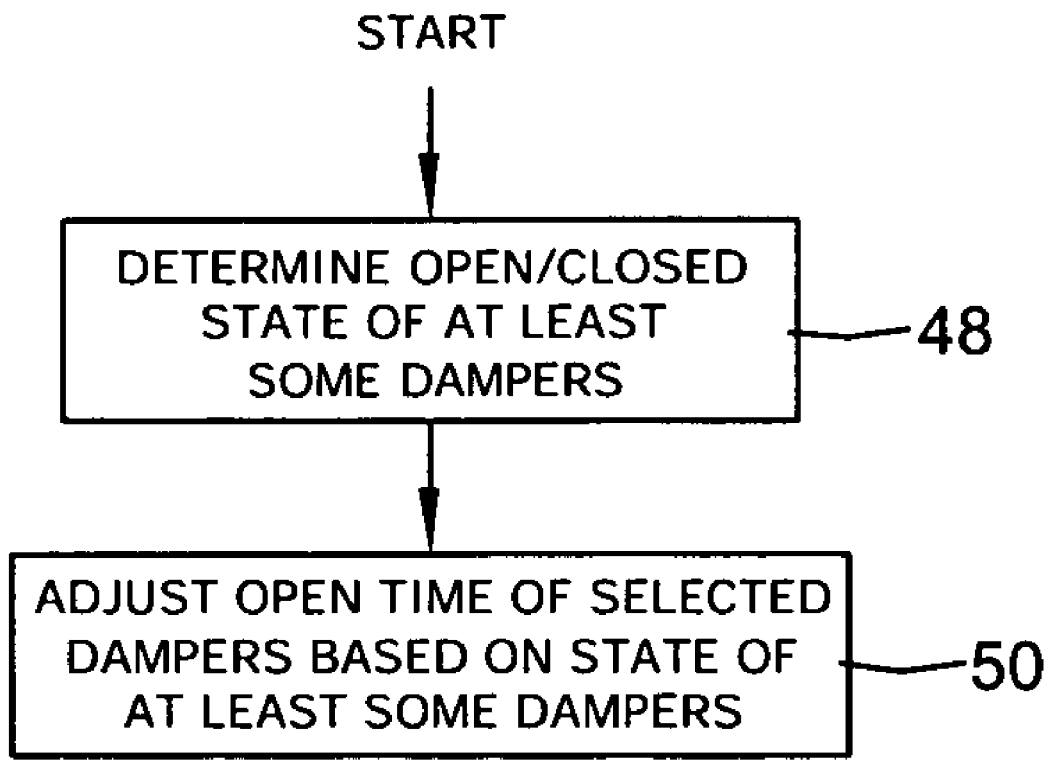
FIG. 5 is a flow diagram showing an illustrative method that may be implemented by the controller of FIG. 1.

FIG. 5 is a flow diagram showing an illustrative method that can be implemented by controller 10. At block 48, controller 10 determines the open or closed state of at least some dampers. In some embodiments, HVAC system 14 can provide conditioned air, i.e. heated air or cooled air, to a system of ductwork that provides the conditioned air to one or more rooms within a house or other structure. If for example the ductwork provides conditioned air to five rooms, the ductwork system may include five dampers that are adapted to regulate airflow into each of the five rooms. Thus, in the example discussed, controller 10 can determine the open or closed status of one, two, three, four or five of the five dampers present in the ductwork system.

At block 50, controller 10 adjusts an open time of one or more selected dampers based at least in part on the status of at least some of the other dampers within the ductwork system. Controller 10 can adjust the open time of the one or more selected dampers in accordance with algorithms that will be discussed in greater detail hereinafter.

Figure 6:
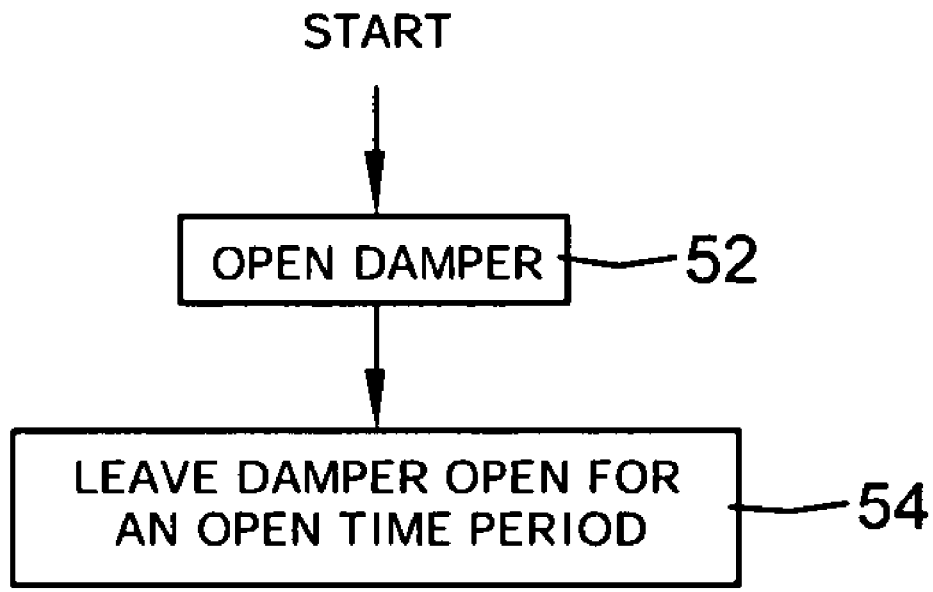
FIG. 6 is a flow diagram showing another illustrative method that may be implemented by the controller of FIG. 1.

FIG. 6 is a flow diagram showing an illustrative method that can be implemented by controller 10. At block 52, controller 10 instructs a damper to open. In some instances, ZONE I/O block 28 (FIG. 1) signals the appropriate zone damper to open. Control passes to block 54, where controller 10 leaves the zone damper open for an open time period. Calculation of the open time period is done by controller 10 using the algorithms discussed in greater detail hereinafter.

Figure 7:
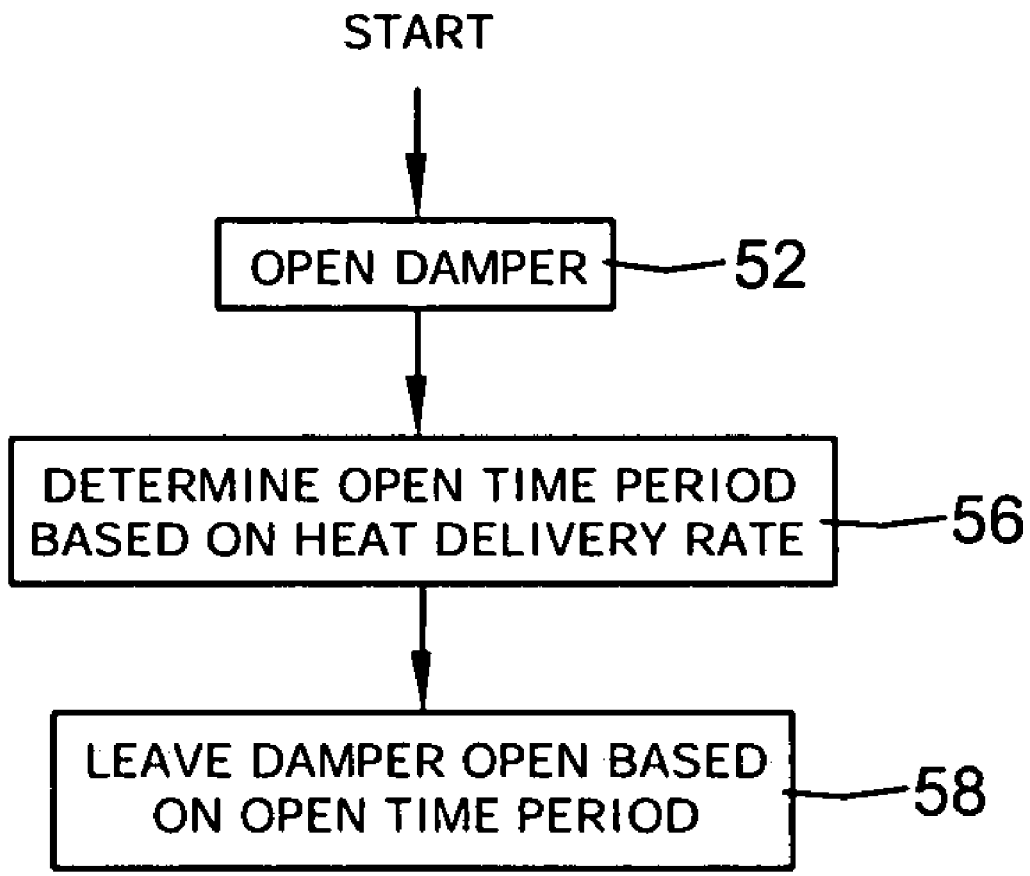
FIG. 7 is a flow diagram showing yet another illustrative method that may be implemented by the controller of FIG. 1.

FIG. 7 is a flow diagram showing an illustrative method that can be implemented by controller 10. At block 52, controller 10 instructs a damper to open. In some instances, ZONE I/O block 28 (FIG. 1) signals the appropriate zone damper to open. At block 56, controller 10 determines an open time period based at least in part on a heat delivery rate to a particular zone. The heat delivery rate can be a function both of the thermal capacity of HVAC system 14 as well as the relative airflow through the ductwork. As noted above, relative airflow can vary both as a function of fan speed and in relation to the number of open versus closed zone dampers within the ductwork. Control passes to block 58, where controller 10 leaves the zone damper open for an open time period.

Figure 8:
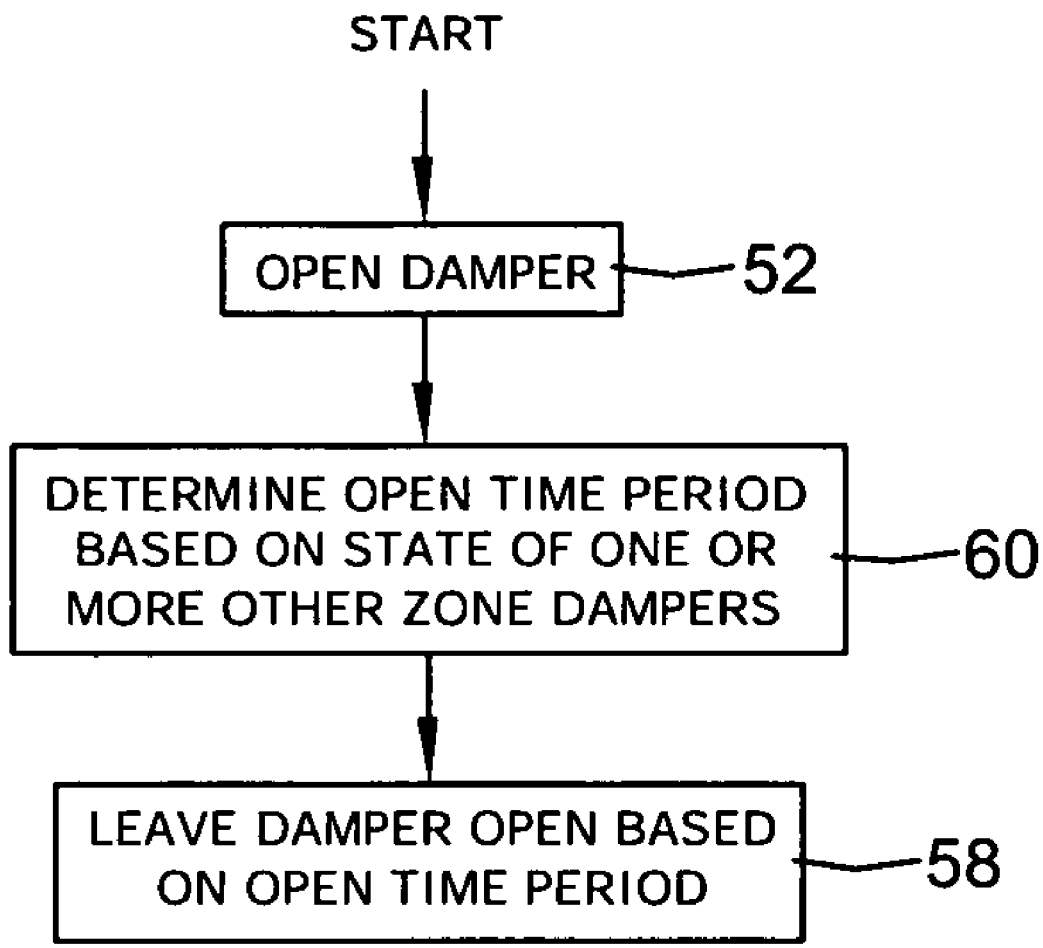
FIG. 8 is a flow diagram showing yet another illustrative method that may be implemented by the controller of FIG. 1.

FIG. 8 is a flow diagram showing an illustrative method that can be implemented by controller 10. At block 52, controller 10 instructs a damper to open. In some instances, ZONE I/O block 28 (FIG. 1) signals the appropriate zone damper to open. Control passes to block 60, where controller 10 determines an open time period for the appropriate zone damper. The open time period can be calculated at least in part as a function of the status of one or more other zone dampers. While the flow diagram shows calculation of the open time period as subsequent to opening the zone damper, the invention contemplates calculating the open time period prior to opening the zone damper or simultaneously with opening the zone damper, as desired. Control passes to block 58, where controller 10 leaves the zone damper open for an open time period.

Figure 9:
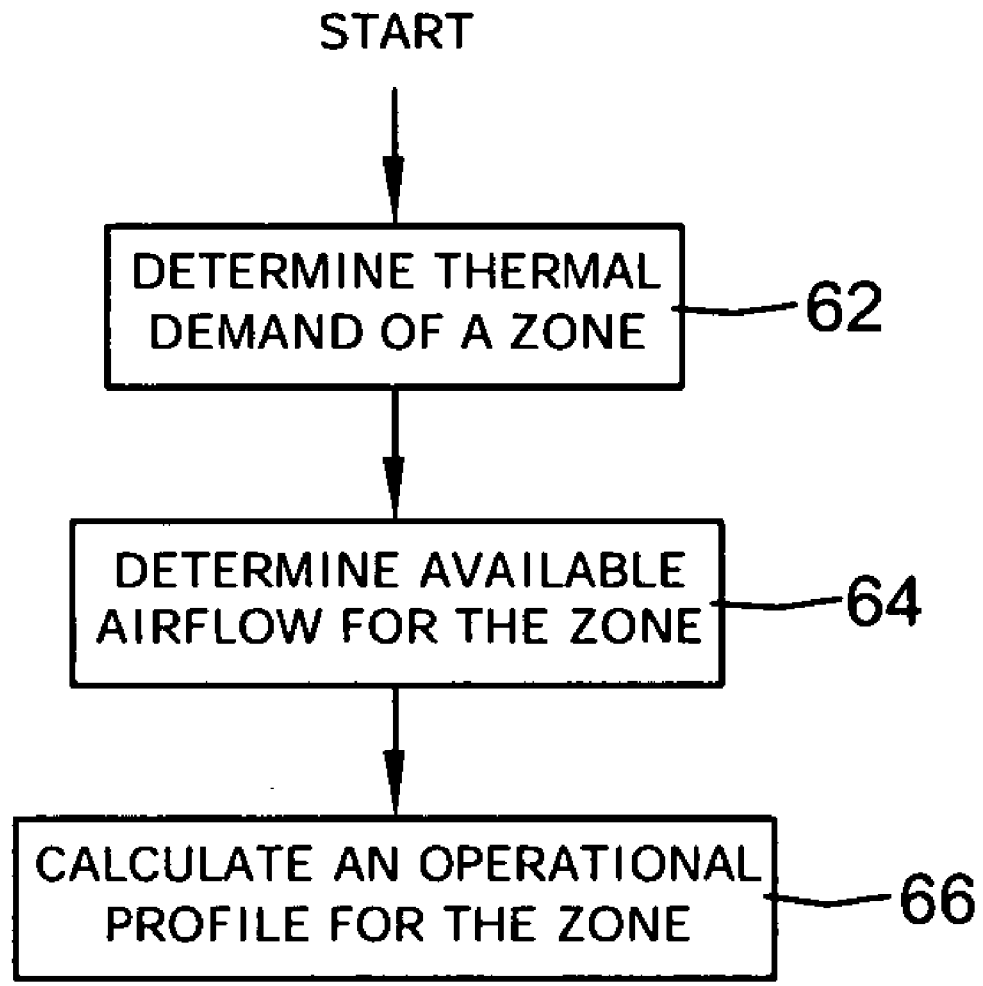
FIG. 9 is a flow diagram showing yet another illustrative method that may be implemented by the controller of FIG. 1.

FIG. 9 is a flow diagram showing an illustrative method that can be implemented by controller 10. At block 62, controller 10 determines the thermal demand of a zone. For illustrative purposes, and referring to FIG. 4, say that controller 10 determines the thermal demand of zone 20. In this example, thermal demand can be defined as an amount of thermal energy that can be added to or removed from zone 20 in order to reach a desired temperature. The thermal demand of zone 20 can be positive, indicating a need to add additional heat to zone 20. The thermal demand of zone 20 can also be negative, indicating a need to remove heat from zone 20. This can be accomplished by actively cooling zone 20, or alternatively, by simply not providing additional heat to zone 20 and allowing zone 20 to cool through radiant cooling, for example.

In some respects, thermal demand can also be defined in terms of a temperature difference between an actual temperature within zone 20 and a desired temperature set point for zone 20. In some embodiments, controller 10 can be in communication through user interface 16 (FIG. 1) with a thermostat. The thermostat can provide controller 10 with information regarding desired temperature set points as well as an actual current temperature within a particular zone.

Once the thermal demand of zone 20 has been determined, control passes to block 64. At block 64, controller 10 determines an available airflow for zone 20. MEMORY block 24 (FIG. 1) can include or be programmed with information regarding the airflow available from HVAC system 14. In some embodiments, airflow can be defined in terms of airflow velocity or volume, and can represent the airflow velocity or volume that can be reproduced by HVAC system 14. In some embodiments, HVAC system 14 has a constant thermal capacity and a single fan speed and thus airflow through the ductwork is a function of how many zone dampers are open versus how many zone dampers are closed.

In some embodiments, especially in larger buildings with a large number of zones and perhaps several main feeder trunk duct lines, the data regarding the airflow capacity of HVAC system 14 can include data regarding the maximum airflow available at a given trunk duct line. In some embodiments, the trunk duct line can be considered as the source of conditioned air.

The amount of air available to a particular zone can vary depending on the status of other zones operatively connected to HVAC system 14. For example, when all of the zone dampers are open, the pressure in the ductwork may be lower than when only one of the zone dampers is open. As a result, more air flow may result in an open zone when all or some of the other zones are closed.

Controller 10 can inquire as to the status of each zone in the system. In the illustrative example and with respect to FIG. 4, controller 10 can send (or receive) a signal to each of zone 18 and 22 via ZONE I/O block 28 to determine the status of each of zone 18 and 22. It should be noted that if n=2, the system includes a total of three zones. However, in many embodiments, n is greater than 2. In such cases, controller 10 can query the status of all of the other zones, if desired.

In some embodiments, controller 10 can determine the airflow available to zone 20 as a function of the airflow capacity of HVAC system 14 (FIG. 4), a total number of zones in the system, and a total number of closed zones and/or a total number of open zones in the system. As the number of closed zones increases relative to a total number of zones in HVAC system 14, the available airflow to one or more zones that remain open will tend to increase, and the pressure in the ductwork will also increase. As will be discussed in greater detail hereinafter, controller 10 can be configured to account for this possible variation in airflow available to a particular zone.

In the illustrative embodiment, and once available airflow has been calculated, control passes to block 66, where controller 10 can calculate an operational profile for a given zone. In the illustrated example, controller 10 can calculate an operational profile for zone 20. In some embodiments, as will be discussed in greater detail hereinafter, the operational profile can include one or more times for either opening or closing the damper that regulates airflow into a given zone, such as illustrative zone 20.

In some embodiments, MEMORY block 24 (FIG. 1) can include data regarding the thermal capacity of HVAC system 14. This data can provide controller 10 with information concerning the maximum heating capacity, say in British Thermal Units (Btu), that HVAC system 14 can produce, or perhaps the maximum cooling capacity, say in Tons cooling.

If HVAC system 14 is capable of adjusting its thermal output as discussed above, the data can include this information as well. The data can also provide controller 10 with data concerning the total number of zones in the system, and in some cases, the heat load presented by each zone.

In some embodiments, especially in larger buildings with a large number of zones and perhaps several main feeder trunk duct lines, the data regarding the thermal capacity of HVAC system 14 can include data regarding the maximum heating or cooling capacity available at a given trunk duct line. In some embodiments, the trunk duct line can be considered as the source of conditioned air.

As noted, controller 10 can be configured to determine an operational profile for a given zone. The operational profile can include times for either opening or closing a damper that regulates airflow into a given zone (zone 20 in the illustrative example). In some embodiments, controller 10 can determine, based on the thermal demand of the zone, the thermal capacity of HVAC system 14, and the airflow available to the given zone, appropriate times for opening and closing the damper to achieve a desired temperature set point within the given zone.

Figure 10:
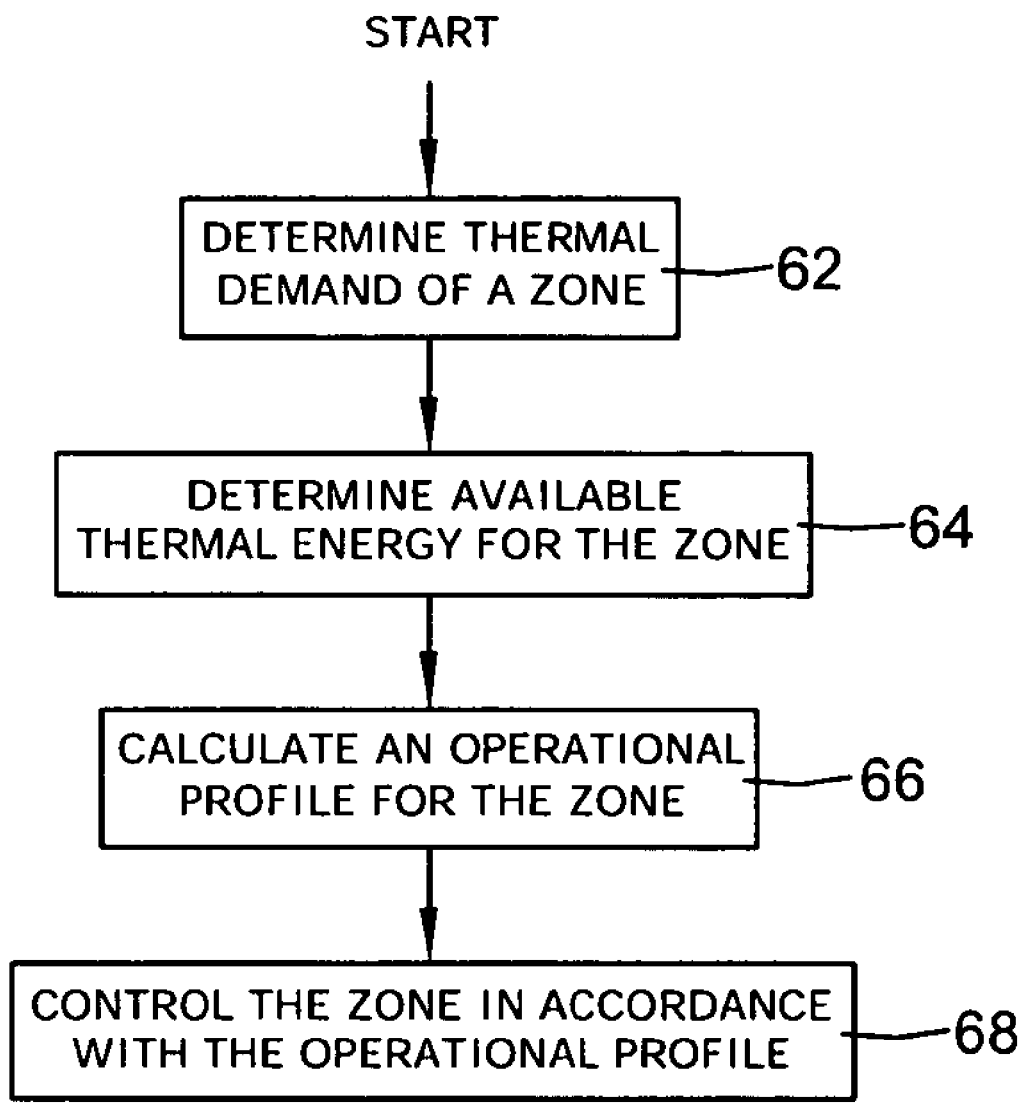
FIG. 10 is a flow diagram showing yet another illustrative method that may be implemented by the controller of FIG. 1.

FIG. 10 is a flow diagram showing another illustrative method that can be implemented by controller 10. At block 62, controller 10 (FIG. 1) determines the thermal demand of a particular zone. This can be accomplished as discussed above with respect to FIG. 9, for example. Control passes to block 64, at which time controller 10 determines the thermal energy available for the particular zone.

In some instances, the thermal energy available for the particular zone can be a fraction of the total thermal capacity of HVAC system 14, where the fraction can be a function of the number of open zone dampers. As the number of open zone dampers decreases, a relatively greater volume of conditioned air will be available to each open zone damper.

In some cases, controller 10 can instruct HVAC system 14 to operate at a lower fan or blower speed when a relatively large number of zone dampers are closed. If HVAC system 14 continues to operate at a constant thermal capacity, the amount of air available to an open zone may remain relatively constant, but the amount of thermal energy present within the air will increase (if for example HVAC system 14 is providing heat). In other instances, HVAC system 14 can operate at a variable thermal capacity as discussed above. The amount of thermal energy available to a particular zone may be a function of each of these factors.

At block 66, controller 10 calculates an operational profile for the zone. Controller 10 can utilize any suitable algorithm to calculate the operational profile, although particular algorithms are discussed hereinafter.

Control passes to block 68, with controller 10 (FIG. 1) controlling or operating the given zone in accordance with the operational profile. In some embodiments, controller 10 can issue commands through ZONE I/O block 28 (FIG. 1) to either open or close a damper in a given zone 18, 20 or 22. In the example shown, controller 10 may manage an operational profile calculated for zone 20. Controller 10 can also issue commands if necessary to HVAC system 14 through HVAC I/O block 30 (FIG. 1). Suitable commands include instructing HVAC system 14 to deliver heated or cooled air, or to switch from one to the other. In some embodiments, controller 10 may instruct HVAC system 14 to increase or decrease its air volume output, or to modify its thermal output.

In some embodiments, the operational profile can include instructions not directly related to heating and cooling. For example, some HVAC systems include filtration equipment, humidification equipment and the like. The operational profile can include appropriate commands governing the operation of this and related equipment.

Figure 11:
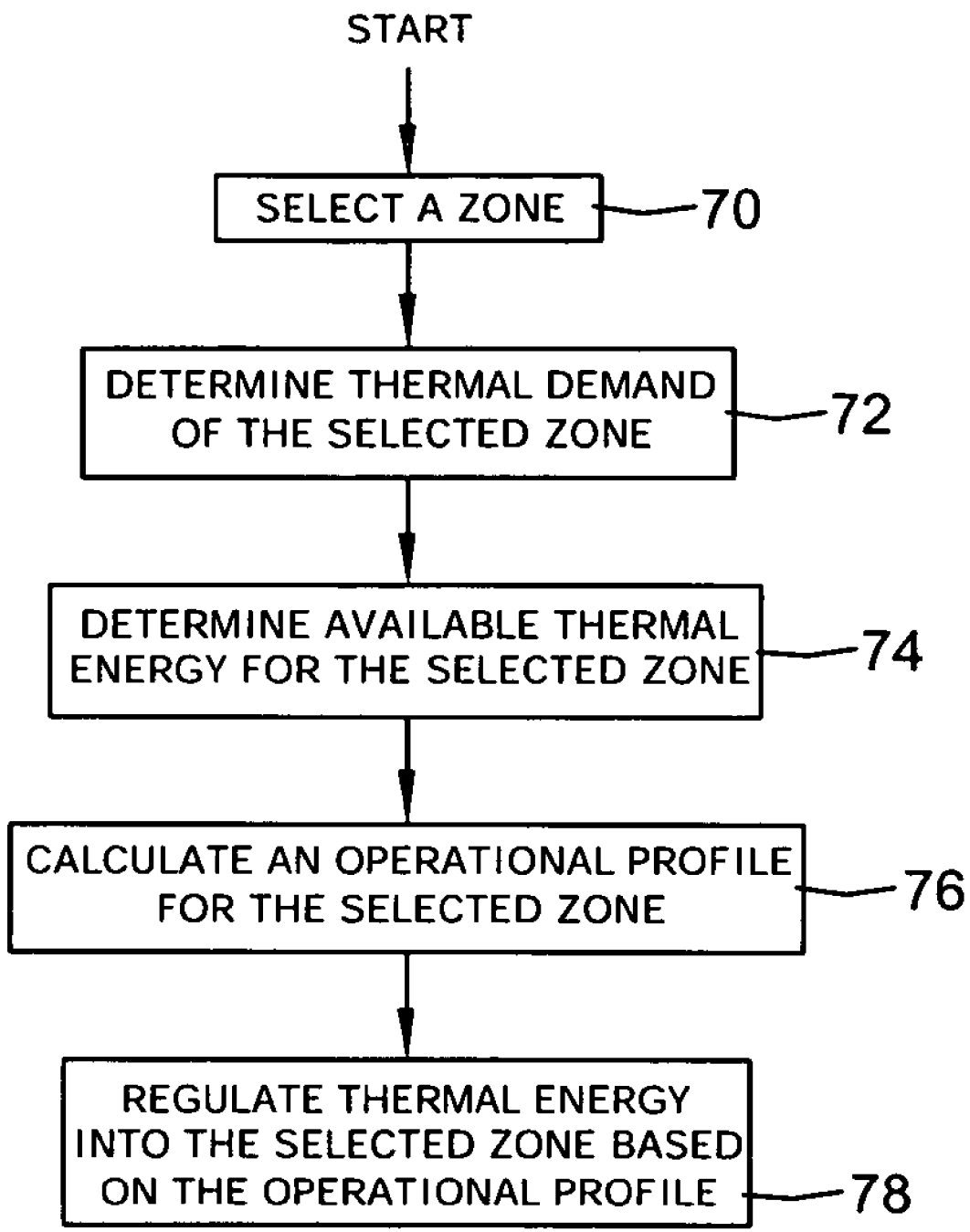
FIG. 11 is a flow diagram showing yet another illustrative method that may be implemented by the controller of FIG. 1.

FIG. 11 is a flow diagram showing another illustrative method that can be implemented by controller 10. At block 70, controller 10 selects a zone. In some embodiments, controller 10 may select a zone based on which zone has the greatest thermal demand, such as the greatest temperature difference between the actual temperature in each zone and a current temperature set point for each zone.

In some embodiments, controller 10 may include (in MEMORY block 24) instructions regarding prioritizing of zones. For example, in a hospital, controller 10 may be instructed to give first priority to critical rooms such as operating rooms, critical care rooms, and the like. In a residential application, controller 10 may be instructed to give first priority to a living room or family room, the priorities may automatically change with time. In some embodiments, for example, the priority assigned to a particular zone can change based on time of day and room occupancy. For example, the family room may be prioritized during the day when children are present, while a bedroom may be prioritized during sleeping times.

Once a zone has been selected, control passes to block 72, at which time controller 10 determines the thermal demand of the selected zone. Controller 10 can determine the thermal demand of the selected zone in any suitable manner, such as those discussed with respect to FIG. 10. At block 74, controller 10 determines the thermal energy available to the selected zone as discussed previously. Control passes to block 76, at which controller 10 calculates an operational profile as discussed with respect to FIG. 9. At block 78, controller 10 regulates the flow of thermal energy (or a heat delivery rate) into the selected zone based on the operational profile. A heat delivery rate can be positive, representing the addition of heat, or it can be negative, representing the addition of cooled air. The discussion with respect to FIG. 10 illustrates how controller 10 may regulate heat delivery into the selected zone.

Figure 12:
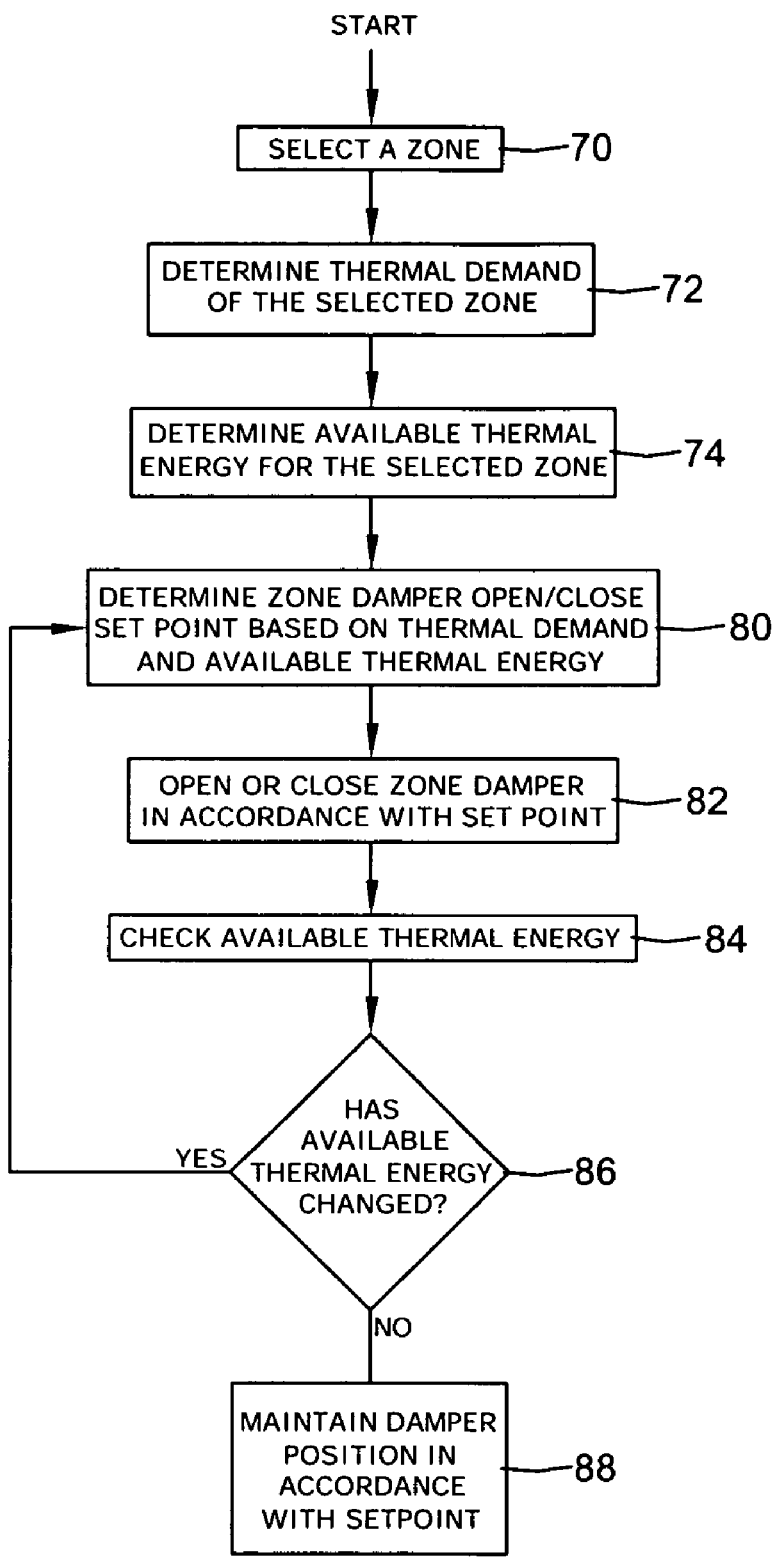
FIG. 12 is a flow diagram showing yet another illustrative method that may be implemented by the controller of FIG. 1.

FIG. 12 is a flow diagram showing another illustrative method that can be implemented by controller 10. At block 70, controller 10 selects a zone as discussed above. Control passes to block 72, where controller 10 determines the thermal demand of the selected zone as discussed previously. At block 74, controller 10 determines the thermal energy available to the selected zone. This can be done in any suitable manner such as described with respect to FIG. 10.

Control then passes to block 80, where controller 10 determines when to open or close a damper regulating airflow into the selected zone. In some embodiments, controller 10 determines a zone damper open and close time. These times may be calculated as a function of the thermal demand of the selected zone and/or the airflow and thus heat delivery rate available to the zone, as discussed previously. In some embodiments, controller 10 may calculate several such times, if desired.

At block 82, controller 10 sends a signal through ZONE I/O block 28 to either open or close the damper in accordance with the open/close times previously calculated. Control then passes to block 84, where controller 10 once again determines an amount of thermal energy available to the selected zone. The thermal energy that is available may change, because other zones may have been opened or closed in the meantime, for example, or HVAC system 14 may have modified its fan speed or thermal output. Controller 10 can check the amount of thermal energy available to the selected zone at any appropriate interval. In some embodiments, controller 10 can check the amount of thermal energy available to the selected zone at an interval of about every five seconds, but any suitable time period may be used.

If the available thermal energy has changed, as queried at decision block 86, control reverts back to block 80. At block 80, controller 10 calculates new zone damper open and/or close times based on the thermal demand of the selected zone and/or the newly calculated airflow available to the zone. However, if at decision block 86 the available thermal energy has not changed, control passes to block 88 at which controller 10 maintains the damper position in accordance with the previously calculated open/close times.

Figure 13:
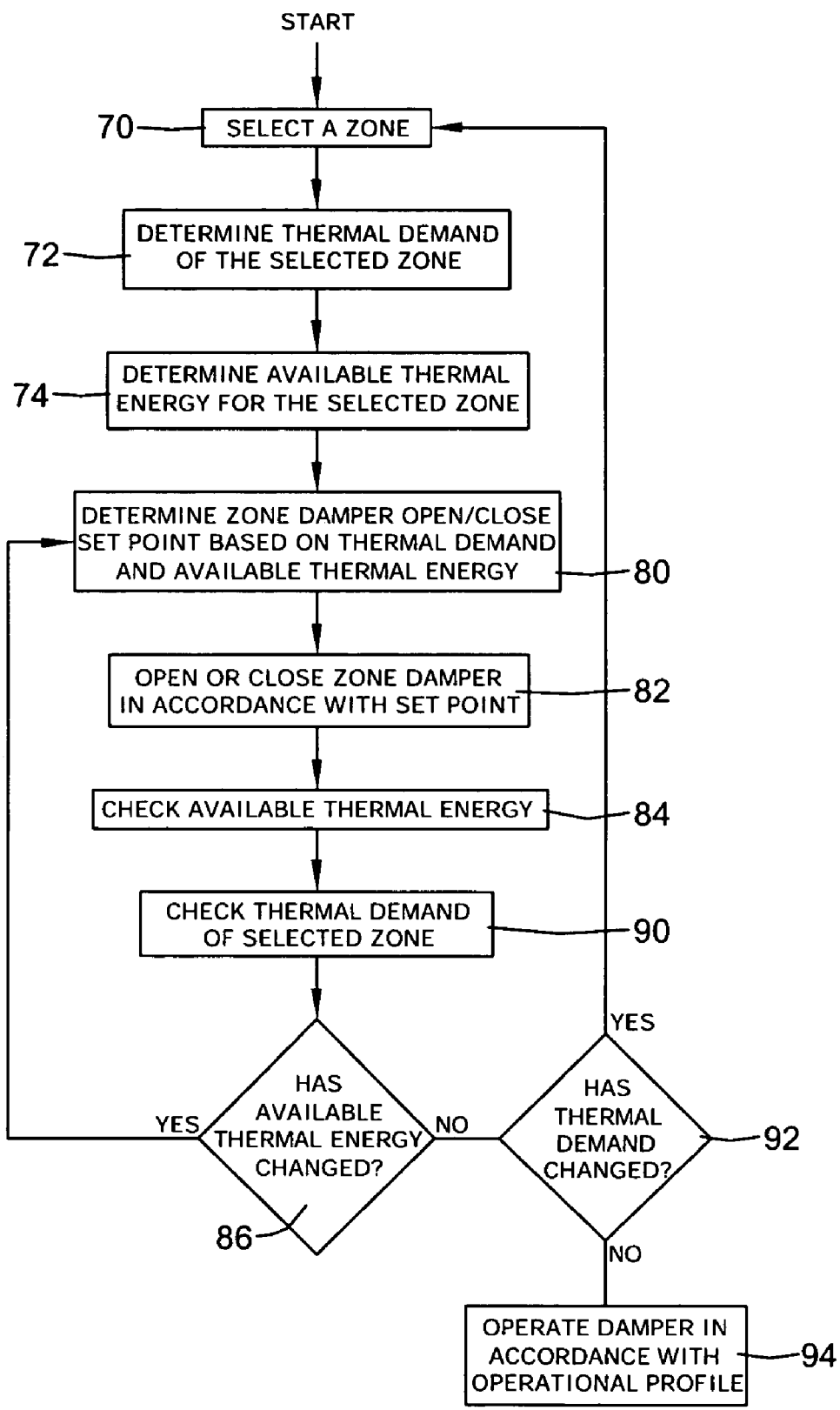
FIG. 13 is a flow diagram showing yet another illustrative method that may be implemented by the controller of FIG. 1.

FIG. 13 is a flow diagram showing another illustrative method that can be implemented by controller 10. At block 70, controller 10 selects a zone as discussed above. Control passes to block 72, where controller 10 determines the thermal demand of the selected zone as discussed previously. At block 74, controller 10 determines the thermal energy or heat delivery rate available to the selected zone. This can be done in any suitable manner such as described with respect to FIG. 10.

Control then passes to block 80, where controller 10 determines when to open or close a damper regulating airflow and thus regulating thermal energy delivery into the selected zone. In some embodiments, controller 10 determines zone damper open/close times. The open/close times may be calculated as a function of at least one of the thermal demand of the selected zone, the airflow available to the zone, the thermal content of the airflow available to the zone, as discussed previously. In some embodiments, controller 10 may calculate several such open/close times, if desired.

At block 82, controller 10 sends a signal through ZONE I/O block 28 to either open or close the damper in accordance with the open/close times previously calculated. Control then passes to block 84, where controller 10 once again determines an amount of thermal energy available to the selected zone. Controller 10 can check the amount of thermal energy available to the selected zone at any appropriate interval. In some embodiments, controller 10 can check the amount of airflow available to the selected zone at an interval of about every five seconds.

Next, controller 10 determines at block 90 if the thermal demand of the selected zone has changed. Control passes to decision block 86, which queries whether the amount of thermal energy available to the selected zone has changed. If the available thermal energy has changed, control reverts back to block 80. At block 80, controller 10 calculates new zone damper open and/or close times based on the thermal demand of the selected zone and/or the newly calculated thermal energy available to the zone.

However, if at decision block 86 the available thermal energy has not changed, control passes to decision block 92, at which controller 10 queries whether the thermal demand of the selected zone has changed. If the thermal demand has not changed, control passes to block 94 at which controller 10 operates the damper in accordance with the operational profile. However, if the thermal demand has changed, control reverts to block 70, at which point controller 10 selects a zone as discussed previously.

Figure 14:
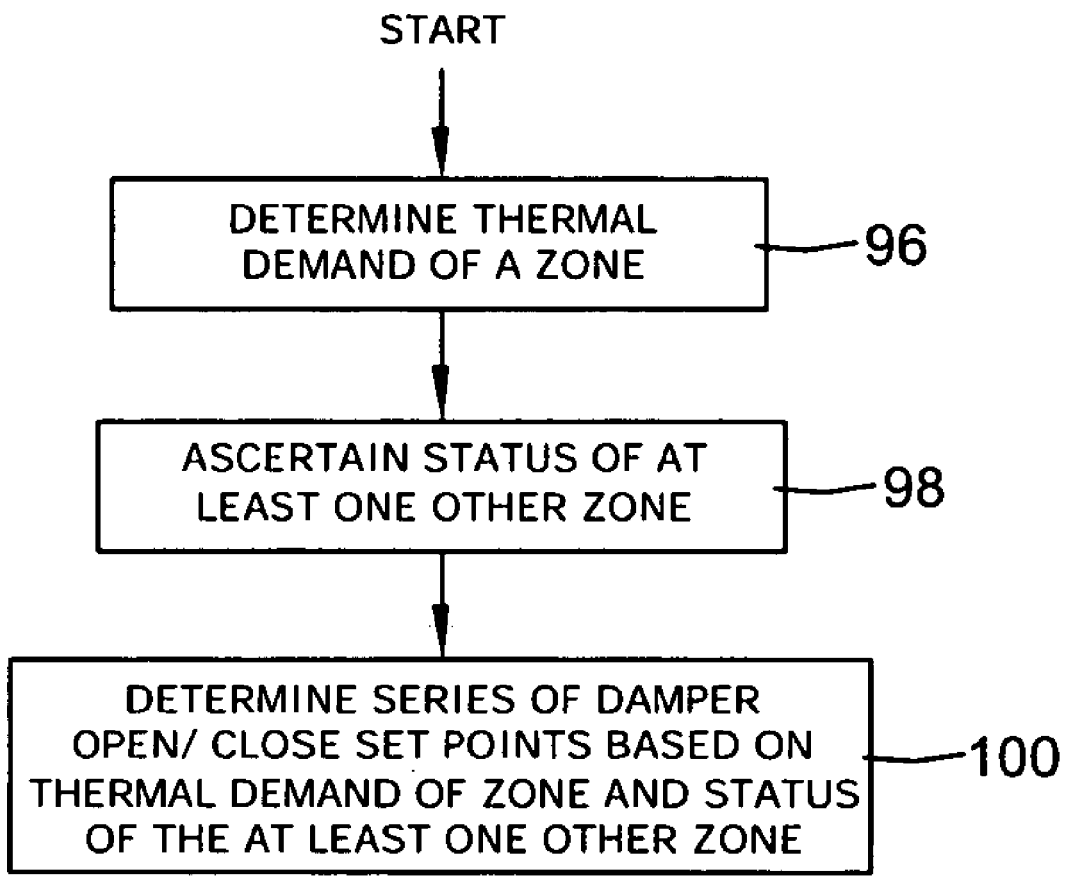
FIG. 14 is a flow diagram showing yet another illustrative method that may be implemented by the controller of FIG. 1.

FIG. 14 is a flow diagram showing yet another illustrative method that can be implemented by controller 10. At block 96, controller 10 determines the thermal demand of a zone, as discussed above. Control passes to block 98, where controller 10 ascertains a status of at least one other zone. In some embodiments, the status can include the open/close status of at least one other zone. At block 100, controller 10 determines, for at least one damper, open and close times based on the thermal demand of the zone and the status of at least one other zone (as determined at block 84). In some embodiments, controller 10 may determine or calculate a series of damper open/close times, if desired.

Figure 15:
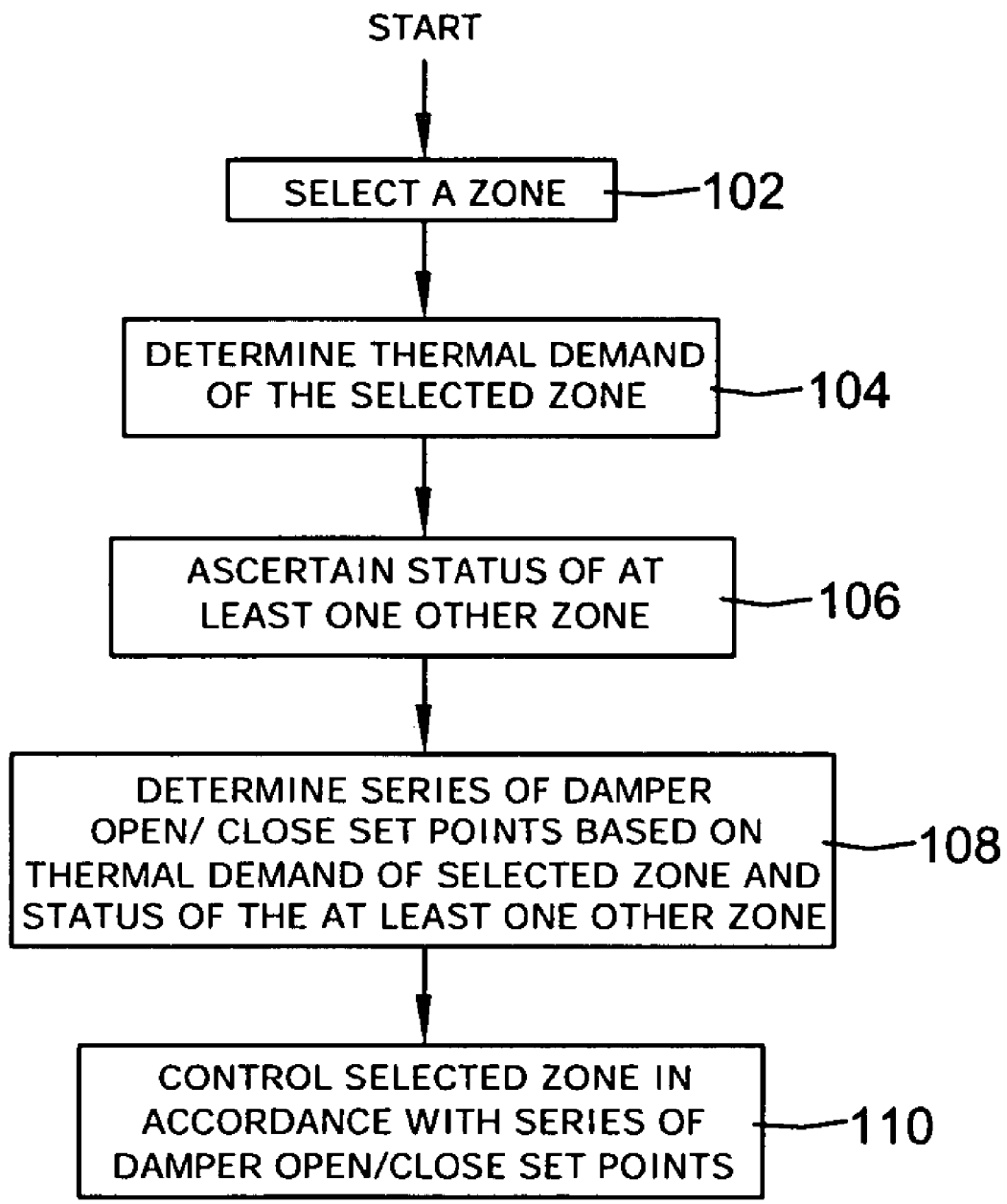
FIG. 15 is a flow diagram showing yet another illustrative method that may be implemented by the controller of FIG. 1.

FIG. 15 is a flow diagram showing another illustrative method that can be implemented by controller 10. At block 102, controller 10 selects a zone using any suitable criteria as discussed. In some embodiments, a zone may be selected based on its relative thermal demand or its previously determined priority. Control passes to block 104, where controller 10 determines the thermal demand of the selected zone in any suitable manner as discussed above.

At block 106, controller 10 ascertains a status of at least one other zone, such as the current open/close status. At block 108, controller 10 determines a series of damper open/close times based on the thermal demand of the zone and the status of at least one other zone (as determined at block 106). Control passes to block 110, where controller 10 controls the selected zone by sending command signals through ZONE I/O block 28 to the zone damper in accordance with the series of damper open/close times determined at block 108.

Figure 16:
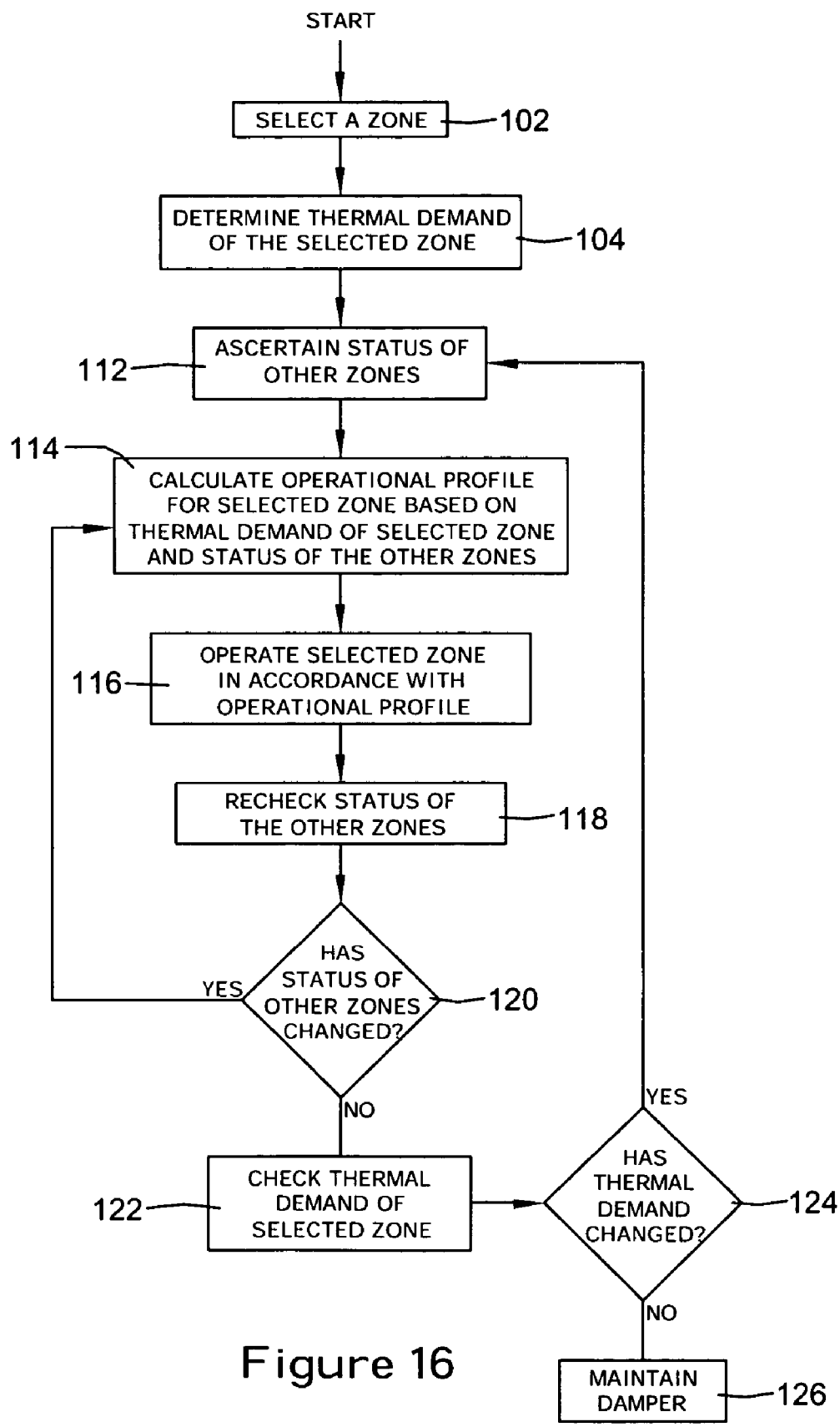
FIG. 16 is a flow diagram showing yet another illustrative method that may be implemented by the controller of FIG. 1.

FIG. 16 is a flow diagram showing another illustrative method that can be implemented by controller 10. At block 102, controller 10 selects a zone using any suitable criteria as discussed. In some embodiments, a zone may be selected based on its relative thermal demand or its previously determined priority. Control passes to block 104, where controller 10 determines the thermal demand of the selected zone in any suitable manner as discussed above. At block 112, controller 10 ascertains a status of other zones, such as the open/close status of the other zones.

Control passes to block 114, at which point controller 10 calculates an operational profile for the selected zone based on the thermal demand of the selected zone (as determined at block 104) and/or the status of the other zones (as determined at block 112). At block 116, controller 10 operates the selected zone in accordance with the operational profile by sending appropriate command signals to the selected zone through ZONE I/O block 28.

At block 118, controller 10 rechecks the status of the other zones. Controller 10 can recheck the status of the other zones at any appropriate interval or time. In some embodiments, controller 10 can check the status of the other zones at an interval of about once every five seconds. At decision block 120, controller 10 determines if the status of the other zones has changed. If the status of the other zones has changed, control reverts back to block 114 and controller 10 calculates a new operational profile based on the thermal demand of the zone and/or the newly changed status of the other zones.

Conversely, if the status of the other zones has not changed, control passes to block 122, at which point controller 10 rechecks the thermal demand of the selected zone. Controller 10 can recheck the thermal demand of the selected zone at any appropriate interval. In some embodiments, controller 10 can check the thermal demand of the selected zone at an interval of about once every five seconds. If the thermal demand has changed, as queried at decision block 124, control reverts back to block 112 and controller 10 ascertains the status of the other zones. If the thermal demand has not changed, control passes to block 126 at which point controller 10 maintains the damper as specified in the operational profile.

Figure 17:
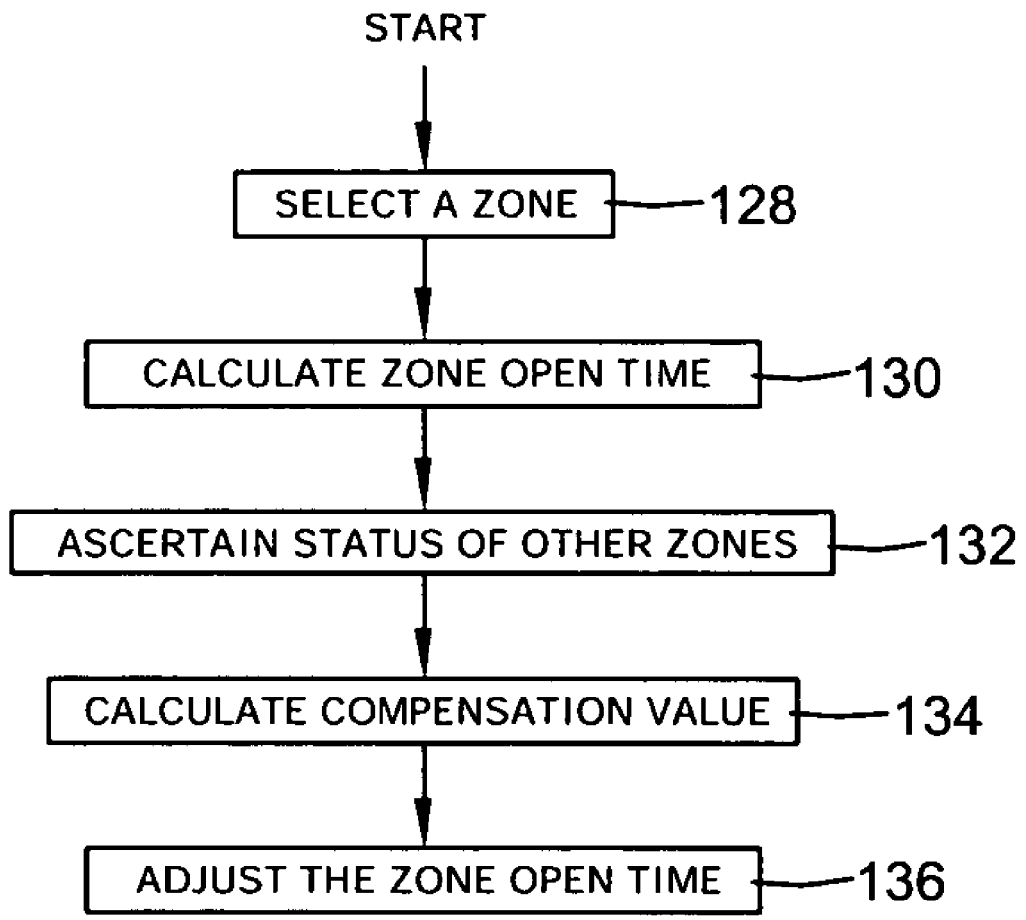
FIG. 17 is a flow diagram showing yet another illustrative method that may be implemented by the controller of FIG. 1.

FIG. 17 is a flow diagram showing an illustrative method that can be implemented by controller 10. Controller 10 selects a zone at block 128, using any suitable criteria as discussed previously. Control passes to block 130, where controller 10 calculates a zone open time. In some embodiments, the zone open time can be a function of the thermal and airflow capacity of HVAC system 14 (FIG. 1) and/or a thermal demand of the particular zone. Control passes to block 132, where controller 10 ascertains the status of other zones. In some embodiments, the status can include an open or closed position status.

At block 134, controller 10 calculates a compensation value. In some embodiments, the compensation value can be a function of the total number of zones compared to the number of open (or closed) zones. For example, if a given system has ten (10) zones, and only two (2) zones are open, the compensation value can be a ratio therebetween. For example, the compensation value can be 10/2=5, which can be used as a speed-up factor for damper operation. In some embodiments, the compensation value may be, for example, 2/10=0.2, which can be used as a delay factor, if desired. At block 122, controller 10 may calculate an adjusted zone open time by dividing the zone open time calculated at block 130 by the speed-up factor. Alternatively, the zone open time may be multiplied by the delay factor to obtain the adjusted zone open time.

Figure 18:
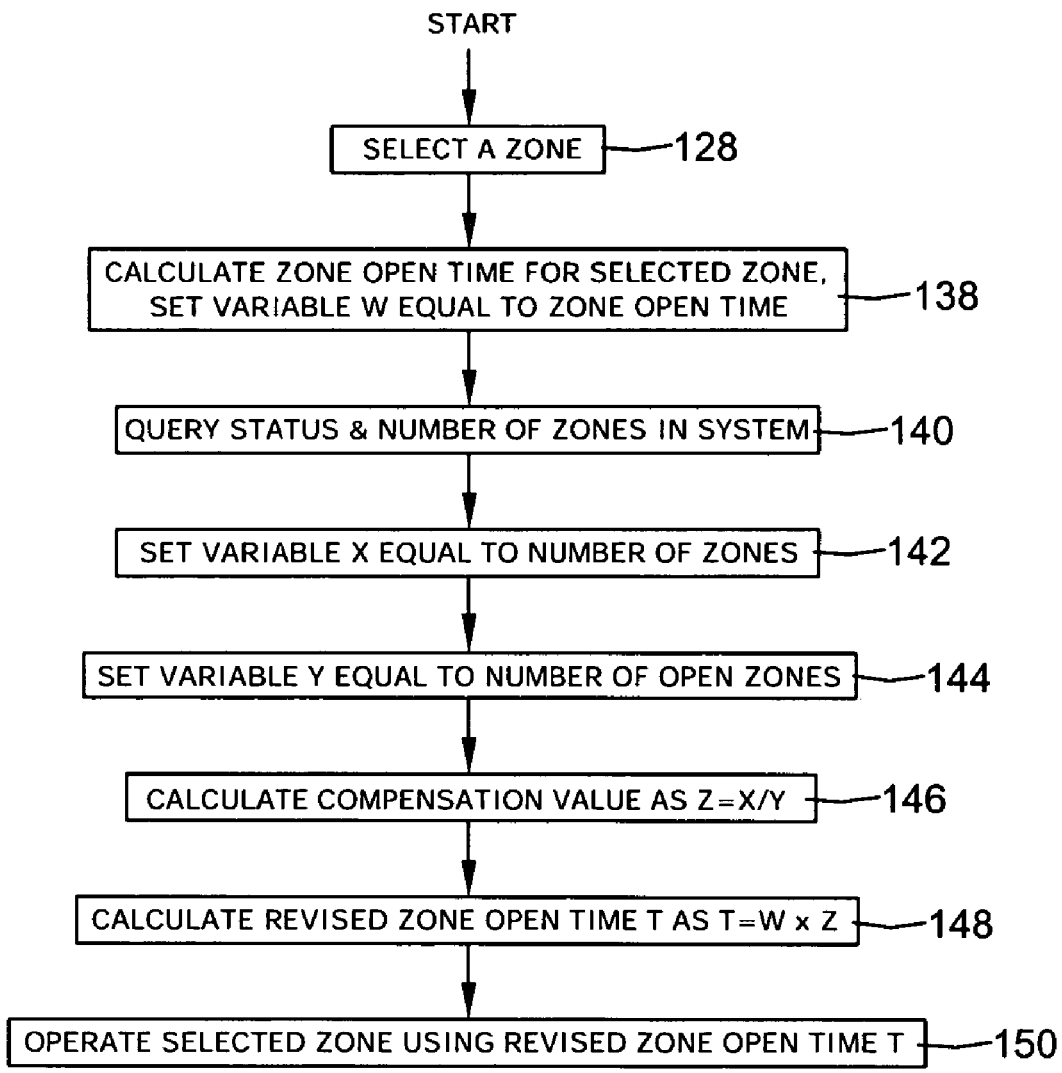
FIG. 18 is a flow diagram showing yet another illustrative method that may be implemented by the controller of FIG. 1.

FIG. 18 is a flow diagram showing another illustrative method that can be implemented by controller 10. At block 128, controller 10 selects a zone using any appropriate criteria as discussed above. Control passes to block 138, where controller 10 calculates a zone open time and sets a variable "W" equal to the zone open time. In some embodiments, the zone open time can be a function of the thermal capacity of HVAC system 14 (FIG. 1) and/or a thermal demand of the particular zone.

Control passes to block 140, where controller 10 queries the number of zones in the system and the status of each zone. In some embodiments, the total number of zones in the system can be programmed into MEMORY block 24 (FIG. 1). At block 142, controller 10 sets a variable "X" equal to the total number of zones in the system. At block 144, controller 10 sets a variable "Y" equal to the number of open zones in the system. Control passes to block 146, at which point controller 10 calculates a compensation value, set as variable "Z", as equal to "X" divided by "Y". At block 148, controller 10 calculates a revised zone open time, set as variable "T", as equal to "W" multiplied by "Z". Control passes to block 150, where controller 10 operates the selected zone using the revised zone open time "T".

In some cases, the controller 10 may include a counter or the like to help track the appropriate open time for a damper. For example, a counter may be initiated when a particular zone damper is opened, and may be closed when the counter counts to a predetermined value. In one illustrative embodiment, the controller 10 may set the predetermined value such that the counter counts to the predetermined value in the time that the particular zone damper is to remain open. Alternatively, or in addition, the counter may count by a counter increment value, wherein the counter increment value is set such that the counter counts to the predetermined value in the time that the particular zone damper is to remain open. Alternatively or in addition, the counter may count by a counter increment value once during each of a series of counter period, wherein the counter period is set such that the counter counts to the predetermined value in the time that the particular zone damper is to remain open. A separate counter may be maintained for each zone damper in the system. It is contemplated that the counter may be implemented in hardware or software, or a combination thereof, as desired.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method of controlling an HVAC system having a plurality of zones, wherein each zone includes at least one zone damper, the method comprising the steps of:
    determining an open/closed state of at least one of the zone dampers that service the plurality of zones; and
    setting an open time for at least one of the zone dampers of the HVAC system based on the state of at least one of the zone damper for which the open/closed state has been determined.

2. The method of claim 1, wherein the setting step sets the open time based on how many of the zone dampers are determined to be in an open state relative to how many of the zone dampers are determined to be in a closed state.

3. A method of controlling thermal energy delivery to a zone within an HVAC system having two or more zones, wherein airflow to at least selected zones is controlled by one or more zone dampers, and wherein the thermal energy provided by the HVAC system to each of the zones is dependent on the open/closed state of at least some of the other zone dampers, the method comprising the steps of:
    opening a first zone damper; and
    leaving the first zone damper open for an open time period, wherein the open time period is dependent on the state of one or more other zone dampers.

4. The method of claim 3, wherein the first zone damper includes an initial open time period, and the initial open time period is reduced by an amount that is dependent on the state of one or more other zone dampers, resulting in the open time period.

5. The method of claim 4, wherein the zone damper corresponds to a particular zone, and the particular zone has a thermal demand, wherein the initial open time period is dependent on the thermal demand of the particular zone.

6. The method of claim 3, wherein the zone damper is left open until a counter counts to a predetermined value.

7. The method of claim 6, wherein the predetermined value is set such that the counter counts to the predetermined value in the open time period.

8. The method of claim 6, wherein the counter counts by a counter increment value, wherein the counter increment value is set such that the counter counts to the predetermined value in the open time period.

9. The method of claim 6, wherein the counter counts by a counter increment value once during each counter period, wherein the counter period is set such that the counter counts to the predetermined value in the open time period.

10. The method of claim 6, wherein the counter is incremented.

11. The method of claim 6, wherein the counter is decremented.

12. A method for controlling the opening and closing of a damper in an HVAC system, wherein the damper is coupled to a duct that delivers air to the damper, and wherein the duct is fluidly connected to one or more other dampers and/or valves that can assume open and closed positions, the method comprising the steps of:
    opening the damper for a length of time;
    closing the damper after the length of time; and
    wherein the length of time is dependent on the position of at least one of the one or more other dampers and/or valves that are fluidly connected to the duct.

* * * * *